United States Patent [19]

Appeldorn et al.

[11] Patent Number: 5,360,270
[45] Date of Patent: Nov. 1, 1994

[54] REUSABLE SECURITY ENCLOSURE

[75] Inventors: Roger H. Appeldorn, White Bear Lake, Minn.; Robert J. Johnson, Hudson, Wis.; Forrest J. Rouser, San Rafael; Robert L. Erwin, Rohnert Park, both of Calif.

[73] Assignee: Minnesota Mining and Manufacturing Company, St. Paul, Minn.

[21] Appl. No.: 875,079

[22] Filed: Apr. 28, 1992

[51] Int. Cl.$^5$ .............................................. B65D 27/30
[52] U.S. Cl. ........................................ 383/5; 229/102
[58] Field of Search ................... 383/84, 5; 229/102; 206/459.5

[56] References Cited

U.S. PATENT DOCUMENTS

| 281,760 | 7/1883 | Gingras . | |
|---|---|---|---|
| 595,510 | 12/1897 | Adams . | |
| 983,093 | 1/1911 | Svenson . | |
| 1,212,262 | 1/1917 | Rockwell . | |
| 1,214,261 | 1/1917 | Balbach . | |
| 1,342,979 | 6/1920 | Beitner . | |
| 1,887,913 | 11/1932 | Bell . | |
| 1,954,242 | 4/1934 | Heppenstall | 20/92 |
| 1,988,868 | 1/1935 | Danuff et al. | 88/17 |
| 2,206,223 | 7/1940 | Dearborn | 287/130 |
| 2,435,183 | 1/1948 | Pezzella | 160/84 |
| 2,461,201 | 2/1949 | Ellis | 2/311 |
| 2,487,400 | 11/1949 | Tupper | 150/0.5 |
| 2,499,898 | 3/1950 | Anderson | 24/206 |
| 2,558,367 | 6/1951 | Madsen | 24/201 |
| 2,632,894 | 3/1953 | Louis | 2/320 |
| 2,717,437 | 9/1955 | Mestral | 28/72 |
| 2,780,261 | 2/1957 | Svec et al. | 150/3 |
| 2,879,018 | 3/1959 | Pence | 248/28 |
| 2,895,753 | 7/1959 | Fentiman | 287/20.3 |
| 2,926,409 | 3/1960 | Perry | 24/217 |
| 3,000,658 | 9/1961 | Sprouse . | |
| 3,009,235 | 11/1961 | Mestral | 28/78 |
| 3,039,340 | 6/1962 | Livermont | 81/177 |
| 3,086,899 | 4/1963 | Smith et al. | 154/45.9 |
| 3,101,517 | 8/1963 | Fox et al. | 24/204 |
| 3,108,924 | 10/1963 | Adie | 161/127 |
| 3,173,184 | 3/1965 | Ausnit | 24/281 |
| 3,182,345 | 5/1965 | Smith | 15/176 |
| 3,192,589 | 7/1965 | Pearson | 24/204 |
| 3,198,228 | 8/1965 | Naito . | |
| 3,263,292 | 8/1966 | Fekete | 24/206 |
| 3,266,113 | 8/1966 | Flanagan et al. | 24/204 |
| 3,335,774 | 8/1967 | Reed | 150/5 |
| 3,353,663 | 11/1967 | Kayser et al. | 206/59 |
| 3,369,265 | 2/1968 | Halberstadt et al. | 15/22 |
| 3,408,705 | 11/1968 | Kayser et al. | 24/204 |

(List continued on next page.)

FOREIGN PATENT DOCUMENTS

| 0382420A2 | 8/1990 | European Pat. Off. . | |
|---|---|---|---|
| 393841 | 10/1990 | European Pat. Off. | 383/5 |
| 2243143 | 10/1991 | European Pat. Off. | 383/5 |
| 515086 | 11/1992 | European Pat. Off. | 383/5 |
| 1807993 | 7/1968 | Germany . | |
| 2352676 | 4/1975 | Germany . | |
| 2127344A | 4/1984 | United Kingdom . | |
| 2138396 | 10/1984 | United Kingdom | 383/5 |

OTHER PUBLICATIONS

"The Tupperware Collection", vol. 1, No. 1, Summer 1986, twenty-eight pages.
Polytyechna entitled "Self-Locking Flat Clamping Tape", one page.

Primary Examiner—Allan N. Shoap
Assistant Examiner—Christopher McDonald
Attorney, Agent, or Firm—Gary L. Griswold; Walter N. Kirn; Jeffrey J. Hohenshell

[57] ABSTRACT

A reusable security package is disclosed that includes a closure mechanism for closing a container and for determining whether the container has been opened.

1 Claim, 7 Drawing Sheets

U.S. PATENT DOCUMENTS

| | | | |
|---|---|---|---|
| 3,545,048 | 12/1970 | Daddona, Jr. et al. | 24/213 |
| 3,557,105 | 5/1971 | Jones | 333/95 |
| 3,604,145 | 9/1971 | Zimmerman | 46/25 |
| 3,618,802 | 11/1971 | Yates | 215/41 |
| 3,633,642 | 1/1972 | Siegel | 150/3 |
| 3,689,346 | 9/1972 | Rowland | 156/245 |
| 3,703,739 | 11/1972 | Young et al. | 15/230.17 |
| 3,730,382 | 5/1973 | Heisler | 220/60 R |
| 3,742,663 | 7/1973 | Duskin | 52/145 |
| 3,780,469 | 12/1973 | Hancovsky | 46/25 |
| 3,869,764 | 3/1975 | Tanaka et al. | 24/204 |
| 3,905,174 | 9/1975 | Heisler | 53/38 |
| 3,955,245 | 5/1976 | Ballin | 24/201 |
| 4,060,089 | 11/1977 | Noiles | 128/325 |
| 4,093,009 | 6/1978 | Iavarone et al. | 150/0.5 |
| 4,244,683 | 1/1981 | Rowland | 425/143 |
| 4,329,384 | 5/1982 | Vesley et al. | 428/40 |
| 4,330,590 | 5/1982 | Vesley | 428/336 |
| 4,374,077 | 2/1983 | Kerfeld | 264/22 |
| 4,403,692 | 9/1983 | Pollacco | 206/223 |
| 4,452,356 | 6/1984 | Dahl | 206/45.32 |
| 4,520,943 | 6/1985 | Nielsen | 220/281 |
| 4,533,042 | 8/1985 | Pollacco | 206/223 |
| 4,576,850 | 3/1986 | Martens | 428/156 |
| 4,581,792 | 4/1986 | Spier | 27/575 |
| 4,709,397 | 11/1987 | Voshall et al. | 383/5 |
| 4,775,219 | 10/1988 | Appeldorn et al. | 350/103 |
| 4,834,552 | 5/1989 | Makowka | 383/5 |
| 4,871,623 | 10/1989 | Hoopman et al. | 428/586 |
| 4,887,339 | 12/1989 | Bellanger | 24/575 |
| 4,941,196 | 7/1990 | Edelman et al. | 383/5 |
| 4,959,265 | 9/1990 | Wood et al. | 428/343 |
| 4,966,470 | 10/1990 | Thompson et al. | 383/5 X |
| 4,979,613 | 12/1990 | McLaughlin et al. | 206/233 |
| 4,988,547 | 1/1991 | Voto, Jr. et al. | 383/84 X |
| 5,071,363 | 12/1991 | Reylek et al. | 439/291 |
| 5,088,164 | 2/1992 | Wilson et al. | 24/576 |
| 5,113,555 | 5/1992 | Wilson et al. | 24/576 |
| 5,201,101 | 4/1993 | Rouser et al. | 24/575 |

REUSABLE SECURITY ENCLOSURE

The present invention relates to a package assembly that includes closure mechanisms which provide means for fastening and unfastening a closure, and means for verifying that the closure has not been opened. The invention also relates to a method of determining whether a closure has been opened.

BACKGROUND

The art is replete with package closures for preventing packages from opening accidentally, for inhibiting or deterring unauthorized persons from opening the package, and for indicating that the packages have been opened, thereby enabling, for example, a consumer or other user to verify whether the closure has been previously opened.

One type of closure in use today is a multilayer security laminate comprising, in order, (1) a verification layer such as a piece of CONFIRM Brand Retroreflective Sheeting (generally available from the Minnesota Mining and Manufacturing Co., of St. Paul, Minn.) adhered to (2) a layer of polyester which is substantially coextensive with the layer of CONFIRM, and (3) a layer of adhesive which bonds the security laminate to the package. If desired, a legend or message may be printed on the upper surface of the polyester so as to be visible through the verification layer.

The layer of adhesive may comprise a pattern of two kinds of adhesive, one of which is selected to preferentially adhere to the polyester and the other of which is selected to preferentially adhere to the substrate. Thus, when opening or removal of such a closure is attempted by prying the polyester from the substrate, the pattern of the adhesive becomes readily apparent, thereby providing indication that the seal has been tampered.

Other examples of prior art packages are shown in U.S. Pat. Nos. 4,709,396 and 4,709,397 to Voshall et al. and U.S. Pat. No. 4,838,708 to Holcomb et al. Many existing prior art security packages encounter problems because they are not reusable. Typically a prior art security package is used once and then disposed, as it cannot thereafter be used to detect whether a package has been tampered with or opened.

Existing prior art security packages typically rely on at least one layer of adhesive. The adhesive may be adversely affected by environmental conditions such as extreme heat, humidity or dust.

U.S. patent application Ser. No. 07/875,186, filed Apr. 28, 1992, now U.S. Pat. No. 5,201,101, issued Apr. 12, 1992, and filed on the same day as the present application describes a method of attaching articles and a pair of articles attached by that method. The entire contents of that patent application are herein expressly incorporated by reference.

U.S. Pat. No. 4,875,259 to Appeldorn discloses several intermeshable articles. Some of the species of intermeshable articles disclosed in 4,875,259 require alignment before pressing the structured surfaces together. The entire contents of U.S. Pat. No. 4,875,259 are herein incorporated by reference.

DISCLOSURE OF THE INVENTION

The present invention is directed to a package assembly comprising a container for enclosing an object and a closure for restricting access to the object within the container which (1) restricts access to the interior surfaces of the container, (2) provides verification of whether the closure has been opened which is not apparent to a person who is unfamiliar with the verification technique according to the present invention (e.g. such as the person who tampers with the container by opening the closure), (3) which operates without the need for adhesives or other closure which may be adversely affected by environmental conditions, and (4) which may be reused several times.

According to the present invention there is provided a reusable package assembly comprising (1) a container for enclosing an object, and (2) a closure movable between an open position which provides access to the interior surfaces of the container so that the object may be enclosed by the container and a closed position which restricts access to the interior surfaces of the container.

The closure includes a verification mechanism for verifying that the closure has not been opened. The closure also includes a first and second sheets or "films" each having at least one major surface at least a portion of that surface being a structured surface. The first and second sheets' structured surfaces include a plurality of tapered elements, each element having at least one side inclined relative to a common plane at an angle sufficient to form a taper. The first and second sheets' plurality of tapered elements are situated to form a plurality of axes including at least one first sheet and at least one second sheet longitudinal axis.

In the closed position of the closure, the first and second sheets are fastened together with the first longitudinal axis situated at an angle relative to the second longitudinal axis. In the closed position, (1) at least one of the tapered elements of the first or the second sheet is axially bent or torsionally flexed or twisted relative to its relaxed, unfastened position, and (2) the inclined sides of one of the first and second sheet's tapered elements are frictionally adhered to at least some of the inclined sides of the other of the first and second sheet's tapered elements to retain the closure in the closed position. Additionally, in the closed position, the first and second sheet's elements form a generally non-repeatable pattern when the closure is in the closed position, and at least one of the first and second sheet comprises a viewing mechanism for observing the pattern of the first and second sheet's elements in the closed position.

The present invention may alternatively be described as a method of closing a container for enclosing an object and for verifying whether the container has been opened comprising the steps of: (1) providing the container essentially as described above, (2) enclosing the object within the container, (3) moving the container's closure from the open to the closed position, (4) then (shortly thereafter) viewing at least a predetermined portion of the pattern (e.g. the orientation or shape of the tapered elements) of the first and second sheet's elements; (5) recording the predetermined portion of the pattern of the first and second sheet's elements just after the closure moves to the closed position to provide a verification record, (6) then viewing the pattern of the first and second sheet's elements just prior to opening the closure; and (7) comparing the pattern of the first and second sheet's elements just prior to opening the closure with the verification record to verify whether the closure has been opened.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
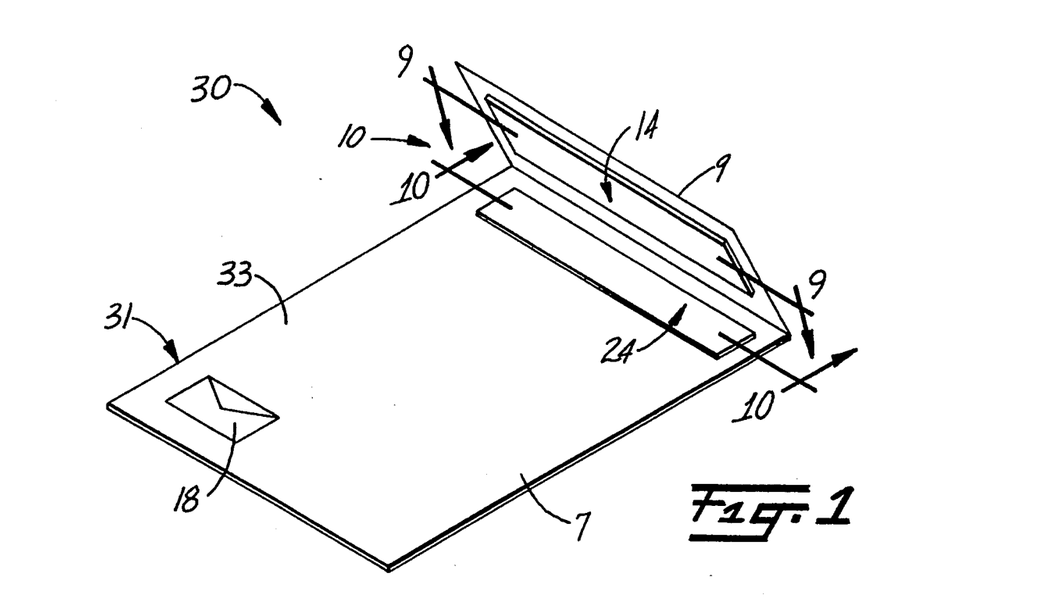
FIG. 1 is a perspective view of an embodiment of a package assembly including a closure according to the present invention with a container in the form of an envelope.
Figure 9:
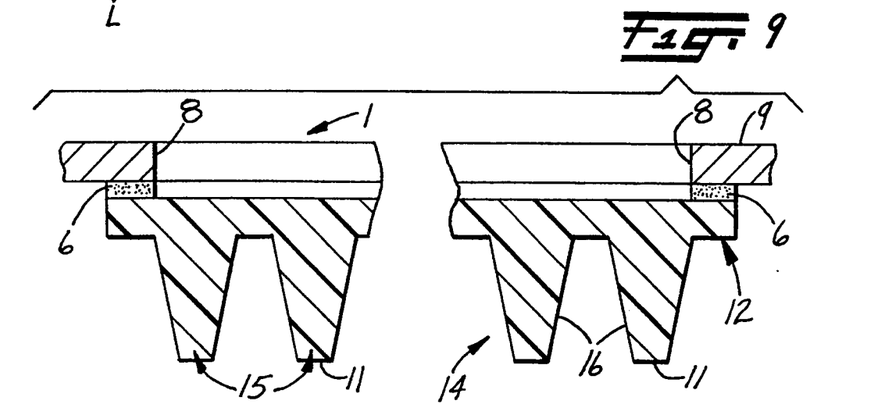
FIG. 9 is an enlarged sectional view of the flap of the envelope of FIG. 1 taken approximately along lines 9—9 of FIG. 1 and with portions broken away to show details.
Figure 10:
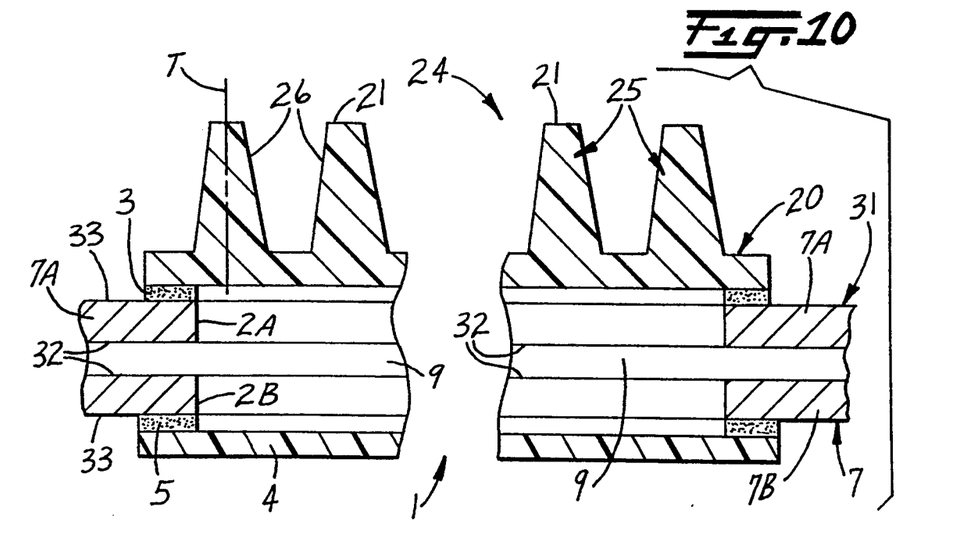
FIG. 10 is an enlarged sectional view of the envelope of FIG. 1 taken approximately along lines 10—10 of FIG. 1 and with portions broken away to show details.
Figure 11:
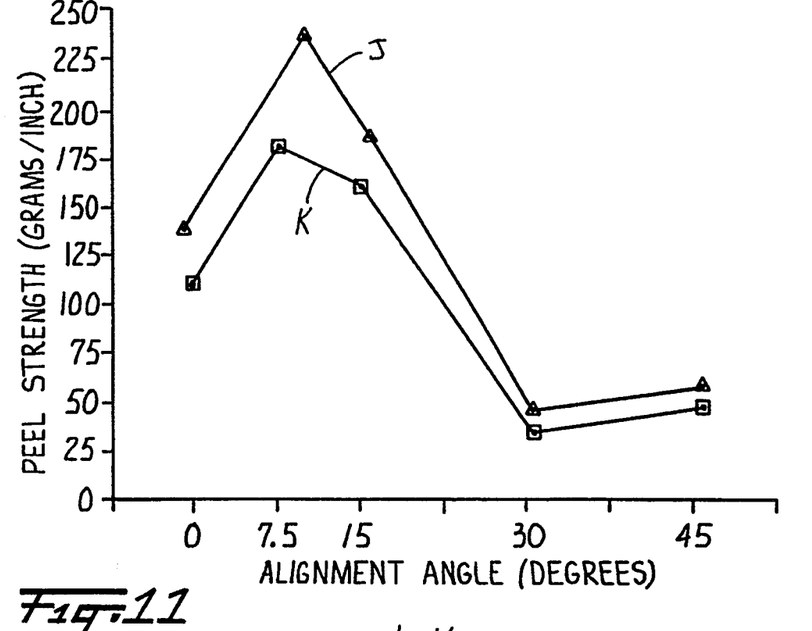
FIG. 11 is a graphical representation of the results of a peel strength test performed on a pair of fastened sheets for use in the package assembly according to the present invention.

Referring now to FIGS. 1, 9 and 10 of the drawing, there is shown an embodiment of a reusable security enclosure or package assembly according to the present invention, generally designated by reference character 30.

The reusable package assembly comprises container means 31 for enclosing an object (not shown). For example as shown in FIG. 1, the container means 31 may comprise an envelope for enclosing documents. Alternatively, the container means may comprise any suitable enclosure which includes closure means such as, but not limited to bags, pouches, vials, bottles, boxes, briefcases, doors, windows or drawers.

The container means 31 encloses an object (not shown). The object may be any suitable object such as but not limited to restricted access documents, computer diskettes or cassettes, trade secret equipment, chemical formulations, legal evidence, medical samples etc. Generally, the object may include any object or objects in which a user wishes to restrict access.

The container means 31 includes interior 32 and exterior 33 surfaces, and closure means 10 movable between an open position (FIG. 1) which provides access to the interior surfaces 32 of container means 31 so that the object may be enclosed by the container means 31 and a closed position (for example FIG. 3) which restricts access to the interior surfaces 32 of the container means 31. The closure means 10 includes verification means for verifying that the closure has not been opened. The closure means 10 is described in greater detail below.

Figure 2:
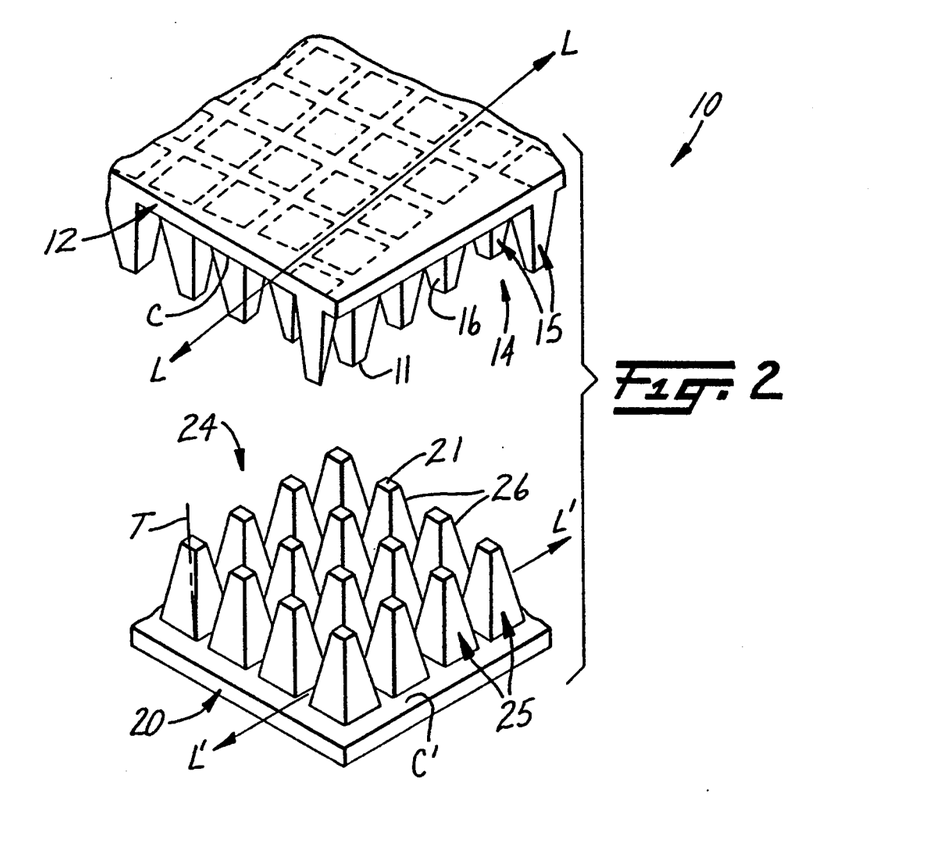
FIG. 2 is an enlarged perspective view of separated first and second sheets for use in the package assembly of FIG. 1 with their longitudinal axes misaligned, and illustrating a plurality of tapered members.
Figure 3:
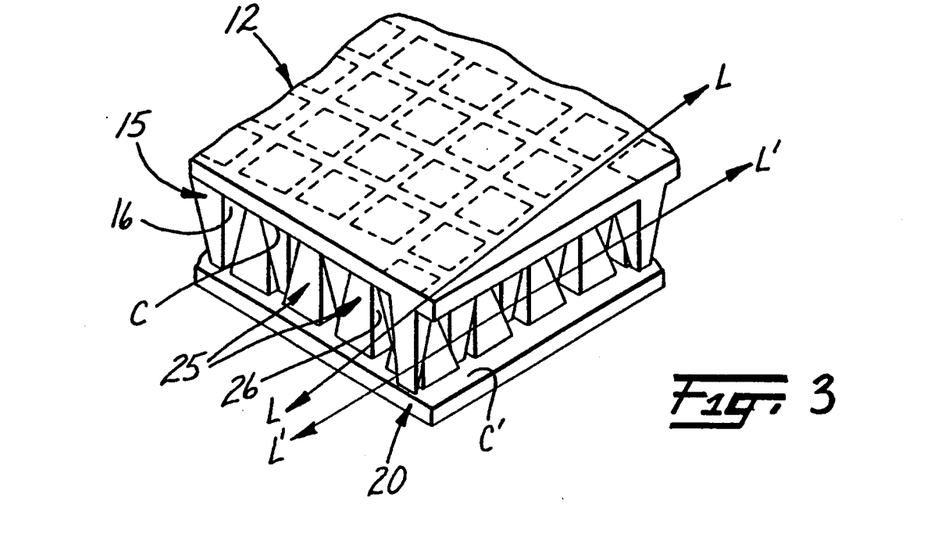
FIG. 3 is an enlarged perspective view of the first and second sheets of FIG. 2 after they have been pressed together and fastened.
Figure 4:
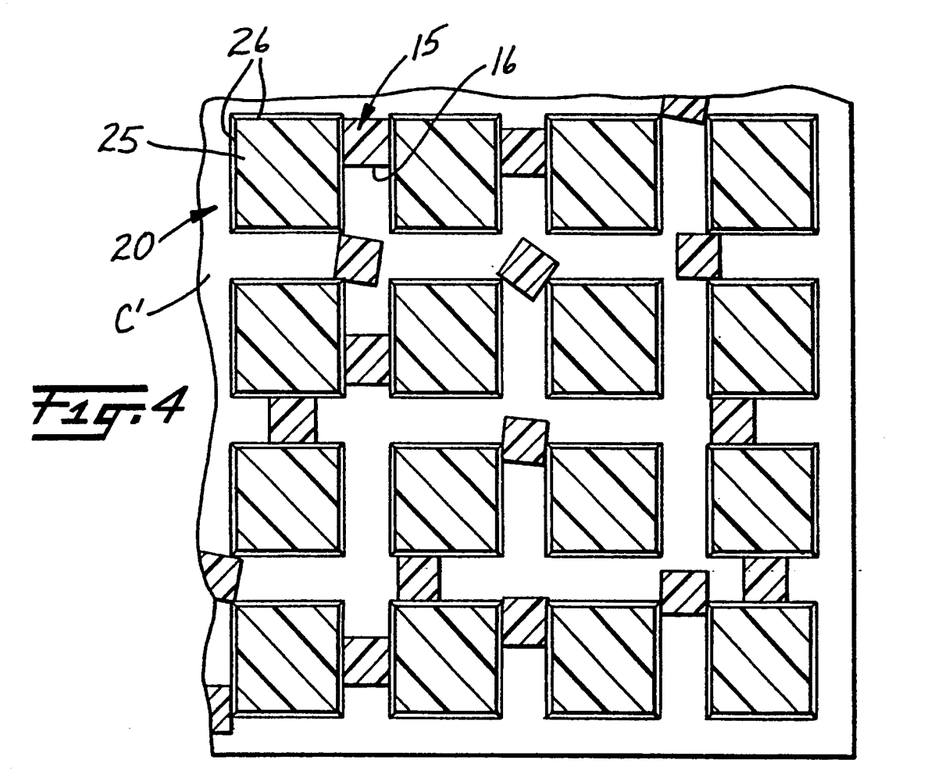
FIG. 4 is an enlarged cross-section of a pair of fastened sheets similar to the sheets shown in FIG. 3.

Referring now to FIGS. 2 and 3 of the drawing, there is shown portions of the closure means 10. The closure means 10 include a first sheet or "film" 12 having a major surface which includes a structured surface 14. The structured surface 14 includes a plurality of tapered elements 15. Each element 15 has at least one side 16 inclined relative to a common plane C at an angle sufficient to form a taper. The tapered elements 15 are situated to form a plurality of axes including a first sheet longitudinal axis L.

The closure means 10 also includes a second sheet or "film" 20 having a major surface which includes a structured surface 24. The structured surface 24 includes a plurality of tapered elements 25. The tapered elements 25 each have at least one side 26 inclined relative to common plane C' at an angle sufficient to form a taper. The tapered elements 25 are situated to form a plurality of axes including a second sheet longitudinal axis L'. The tapered elements 15 and 25 may, for example, have a shape in an unfastened position such as that shown in FIG. 2.

The axes L and L' are preferably situated or disposed generally between periodic arrays or rows of tapered elements such that the rows are symmetrical about the axes L or L' (see e.g. FIG. 2). Alternatively, the axes may be situated between periodic rows of tapered elements that are not symmetrical about the axes. It should be noted that the tapered elements need not be periodic and may even be arranged randomly. In the event that the tapered elements are not arranged to form a periodic arrangement (e.g. where they are randomly arranged), an imaginary axis may be arbitrarily established.

Preferably, the first 12 and second 20 sheets are fastened together by the steps of: (1) providing the first sheet 12; (2) providing the second sheet 20; (3) disposing the first longitudinal axis L at an angle (theta $\theta$) relative to the second longitudinal axis L' (FIG. 2); and (4) then pressing the structured surfaces 14 and 24 of the first 12 and the second 20 sheet together (FIG. 3) such that after the structured surfaces 14 and 24 are pressed together, at least one of the tapered elements 15 or 25 of the first 12 or the second 20 sheet is axially bent and torsionally flexed relative to its relaxed, unfastened position (as shown in FIG. 2), and such that the inclined sides 16 of the first sheet's tapered elements 15 are frictionally adhered to the inclined sides 26 of the second sheet's tapered elements 25.

Figure 14:
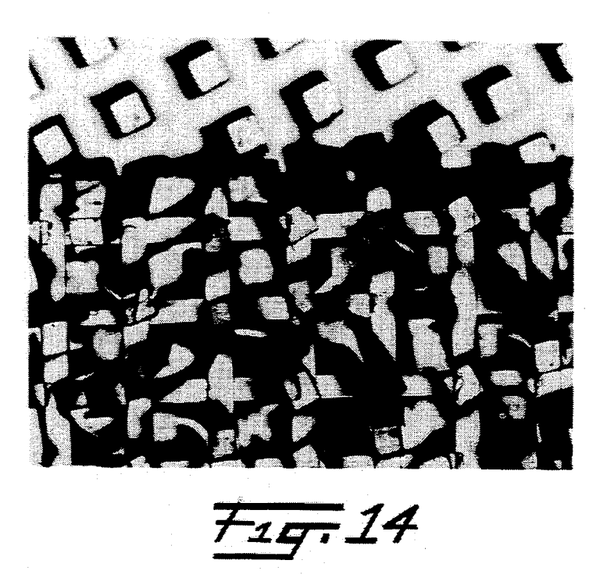
FIG. 14 is a photomicrograph taken through a Leitz Microscope at a magnification of forty times (40×) illustrating axial bent and torsional twisted pyramidal-shaped members of first and second fastened sheets for use with the package assembly according to the present invention.
Figure 15:
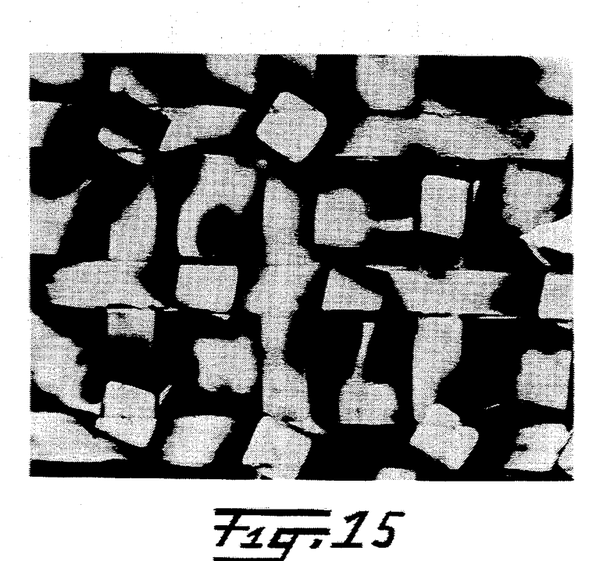
FIG. 15 is a photomicrograph taken through a Leitz Microscope at a magnification of eighty times (80×) illustrating axial bent and torsional twisted pyramidal-shaped members of first and second fastened sheets for use with a package assembly according to the present invention.

When the sheets are initially pressed together the tapered elements 15 and 25 take a shape or orientation such as the shapes and orientations shown in FIGS. 14 and 15. When the sheets were pressed together and the shape and orientation of the tapered elements was recorded over multiple tests, it was surprisingly found that the tapered elements 15 and 25 do not tend to take the same shape. Surprisingly, the alignment of the axially bent and torsionally twisted tapered elements 15 and 25 appears to be a random alignment that is at least extremely difficult to repeat. It is the random pattern of alignment of the tapered elements 15 and 25, and their unpredictable orientation characteristic which renders them particularly suitable for use in the security package assembly 30 according to the present invention.

As used in this application, the phrase "axially bent" is defined as follows: The tapered elements 15 and 25 have a relaxed shape in an unfastened position such as that shown in FIG. 2. There are no external forces or influences acting on the tapered elements in the unfastened position. The tapered elements (e.g. 15 and 25) have an imaginary longitudinal axis T (FIG. 5) which passes through the center or centroid of the tapered element (e.g. 15 or 25). For example, in FIG. 5, because of the symmetrical shape of the tapered elements and the assumption that the tapered elements have a constant density, the longitudinal axis T is generally perpendicular to the common plane C or C'. In this application when it is said that the tapered elements are "axially bent", it is meant that the elements are deflected or deformed to a shape having an imaginary longitudinal axis T' (FIG. 5) passing through the geometric center of the deformed element which is at an angle or otherwise displaced relative to the relaxed position of the imaginary longitudinal axis T in the unfastened state.

As used in this application, torsionally flexed or twisted is defined as follows: The tapered elements 15 or 25 have a relaxed orientation in planes perpendicular to the imaginary longitudinal axis T (see FIG. 2) in an unfastened state. In this application, when it is said that the tapered elements are torsionally twisted, it is meant that the elements are radially displaced relative to their orientation in the unfastened state or position using the axis T and a corner of top surface 11 as references.

Figure 5:
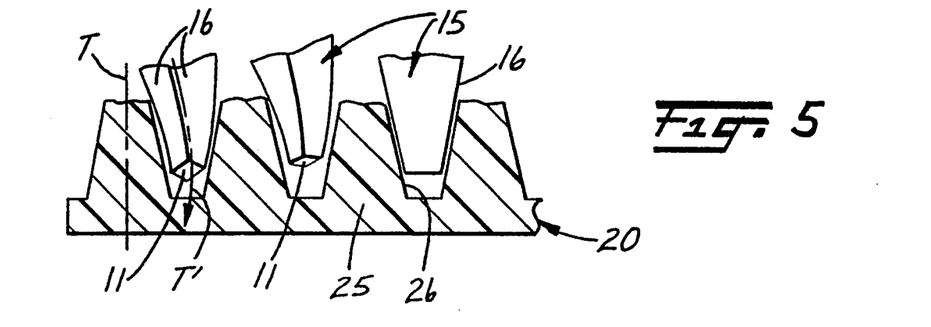
FIG. 5 is a reduced side cross-section of the sheets shown partially in FIG. 4.
Figure 6:
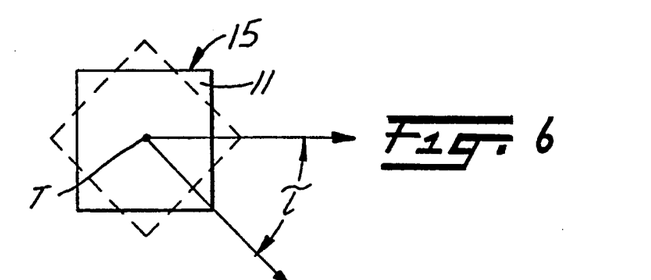
FIG. 6 is a schematic representation of the top of a flexible tapered element in an unfastened, relaxed state (solid lines) and a twisted, fastened state (dashed lines)

Referring now to FIGS. 5 and 6 there is shown an example of the closure means 10 shown in FIGS. 2 and 3 wherein the first sheet 12 is constructed from a relatively flexible material so that the tapered elements 15 may bend and the second sheet 20 is constructed from a relatively rigid material so that the elements 25 do not bend. As best seen in FIG. 5, the shape of the second sheet's tapered elements 25 remains the same in the fastened and in the unfastened position. However, the first sheet's tapered elements 15 both axially bend and twist.

Referring to the tapered elements 15 in FIG. 5, the elements 15 are deflected or deformed to a shape having an imaginary longitudinal axis T' passing through the geometric center of the deformed element 15 which is at an angle relative to the relaxed position of the imaginary longitudinal axis T (not shown for the element 15 in FIG. 5) in the unfastened state. Compare the positions of the imaginary axes T and T' in FIG. 5.

The elements 15 shown in FIGS. 5 and 6 also torsionally twist. As best seen schematically in FIG. 6, element 15 has an orientation in planes perpendicular to the imaginary longitudinal axis T in an unfastened state (solid lines), such as the plane which passes through the top surface 11. In the fastened position, the tapered element 15 is torsionally twisted (dashed lines), the element 15 is radially displaced the angle tau relative to its orientation in the unfastened state or position using the axis T and a corner of surface 11 as references.

It should be noted that the angle tau does not necessarily correspond to the angle theta for a closure. Instead, the angle tau may vary widely for different tapered elements 15 or 25 on the same sheet 12 or 20. If one of the sheets 12 or 20 is constructed from a relatively rigid material and the other sheet is constructed from a flexible material (see FIG. 5), the angle tau for the rigid material is generally zero. Preferably, however each of the sheets 12 or 20 may be constructed from a flexible material.

FIGS. 9 and 10 illustrate one example of the container means 31 in the form of an envelope in greater detail. The envelop may comprise a flap 9 and a pouch portion 7.

The closure means 10 includes at least one of the first 12 and second 20 sheet comprises viewing means 1 for observing the pattern of the first 12 and second 20 sheet's elements 14 and 24 in the closed position. For example, one or both of the sheets 12 or 20 may be a transparent sheet so that the orientation of the tapered elements may be viewed through a microscope or through the human eye.

An example of a viewing means 1 is shown in FIGS. 9 and 10. The flap 9 of the envelope comprises a window portion 8. The sheet 12 may be adhered over the window portion 8 of the flap 9 by means of a pressure sensitive adhesive 6. Referring to FIG. 10, the pouch 7 may comprise upper and lower portions 7A and 7B. The upper pouch portion 7A includes a window portion 2A which may simply be a window cut out of the pouch portion 7A. The second sheet 20 may be adhered to the upper pouch portion 7A by means of a pressure sensitive adhesive 3. The lower pouch portion 7B includes a window portion 2B generally opposite window portion 2A. The window portion 2A may be covered by a transparent film 4 attached to the lower pouch portion 7B by means of a pressure sensitive adhesive 5. The transparent film 4 is adapted to protect the document enclosed within the container means 31 (e.g. the envelope).

It should be noted that viewing means 1 may comprise a variety of approaches, provided that, in the closed position, it is possible to examine the orientation of the tapered elements 15 and 25. For example, in the container means 31 shown in FIGS. 1, 9 and 10, the first sheet 12 may comprise a clear, transparent sheet and the second sheet 20 may be an opaque sheet. Thus, window portions 2A, 2B, 4, 5 shown in FIG. 10 may be optionally omitted. Alternatively, the entire container means 31 may be constructed from first and second sheets 12 and 20 with structured surfaces 12 and 20.

FIGS. 14 and 15 are photomicrographs of first 12 and second 20 flexible fastened sheets which illustrate flexible tapered elements 15 and 25 that are both axially bent and torsionally twisted or flexed. The sheets 12 and 20 are clear and transparent and for example, may be the sheets 12 and 20 illustrated in FIGS. 1, 9 and 10.

The present invention may alternatively be described as a method of closing a container means 31 for enclosing an object (not shown) and for verifying whether the container has been opened comprising the steps of:

(1) providing the container means 31;

(2) enclosing the object within the container means 31, (3) moving the closure means 10 from the open to the closed position, (4) then viewing at least a predetermined portion of the pattern of the first and second sheet's elements 15 and 25;

(5) recording the predetermined portion of the pattern (e.g. the orientation or shape of the tapered elements) of the first and second sheet's elements 15 and 25 just after the closure means 10 moves to the closed position to provide a verification record, (6) then viewing the pattern of the first and second sheet's elements 15 and 25 just prior to opening the closure means 10; and (7) comparing the pattern of the first and second sheet's elements 15 and 25 just prior to opening the closure means 10 with the verification record to verify whether the closure means 10 has been opened.

Figure 16:
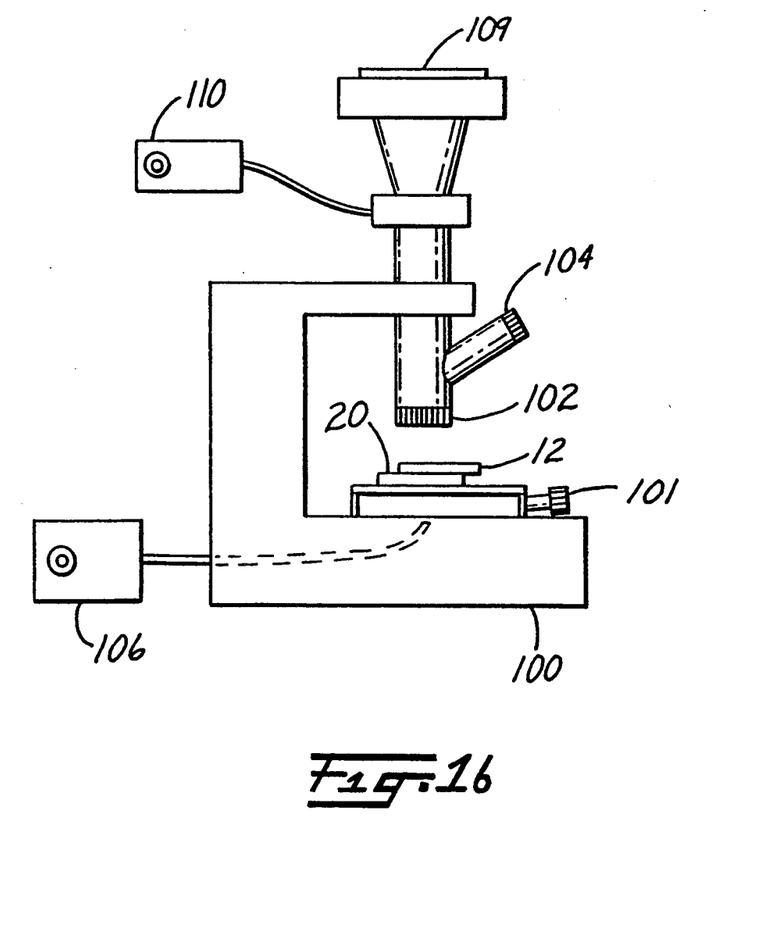
FIG. 16 is a schematic illustration showing the equipment used to take the photomicrographs of FIGS. 14 and 15.

FIG. 16 illustrates one example of how the pattern of the first and second sheet's elements 15 and 25 may be recorded and viewed according to steps 4, 5, 6 and 7 above, and also how a verification record pursuant to step 5 above may be obtained. Additionally, FIG. 16 illustrates how the pattern of the first and second sheet's elements 15 and 25 just prior to opening the closure means 10 may be compared with the verification (see step 7 above).

FIG. 16 illustrates the equipment used to take the photomicrographs of FIGS. 14 and 15. Clear or transparent first and second sheets 12 and 20 were provided such as described in Example 1 infra. The structures were attached to one another by the following steps: (1) The axis L & L' are misaligned. (2) The sheets 12 and 20 of closure means 10 are pressed together with moderate finger pressure. (3) The sheets 12 and 20 are then placed on the tray of a Leitz Optical Microscope 100 (e.g. the Leitz Optical Microscope, generally available from Leitz of Wetzlar Germany or Technical Instruments Co. of San Francisco, Calif.).

An X Y theta stage Boeckeler Digital micrometer (reference character 101) model 1398 generally available from TKL Inc., of Newport Beach, Calif. was provided so that a user may manipulate the position of the sheets 12 and 20 relative to the microscope 100. For example, a user may wish to identify only a portion of the closure means 31 to determine whether that portion has been opened. That portion may be identified by a black framework on the surface of sheet 12 opposite structured surface 14, or by a framework that is not ordinarily visible and may, for example, only be visible under ultraviolet or black light. The micrometer 101 may be used to optically find that surface or framework.

A 10× objective 102 and a 10× eyepiece 104 generally available from Leitz of Wetzlar, Germany or Technical Instruments Co. of San Francisco, Calif. (e.g. model no. NPL10X) were used to take the photomicrographs shown in FIGS. 14 and 15.

The microscope 100 was focused through the back of sheet 12 to the base of element 15 and the tip of element 25. The sample was illuminated from the bottom as shown in FIG. 17, by means of an Intralux 5000 120 volt, 180 watt light supply 106, generally available from the Volpi Manufacturing Company, Inc. of Auburn N.Y. Light passed through sheet 20 then 12 to the objective 102.

A camera 109 is provided. For example, the camera may be a WILD camera 109 generally available from WILD of Heerbrugg, Switzerland. The camera 109 is loaded with film such as Polaroid high speed black and white 667 film. An exposure device 110 is provided such as a Wild photomat MSP 45 generally available from WILD of Heerbrugg, Switzerland.

The camera 109 has a 0.8× magnification for a photomicrograph magnification of 80× (e.g. the photomicrograph of FIG. 15). The Wild photoautomat MPS 45 (reference character 110) controlled the exposure of the camera 109. For FIG. 14, a 5× objective was substituted.

Referring now to FIGS. 2 and 3, the angle theta $\theta$ is the angle between the axes L and L'. The angle theta $\theta$ is generally between more than zero (0) and less than about twenty (20) degrees and is preferably seven-and-one-half (7.5) degrees for reasons set forth below.

When the first 12 and second 20 sheets are brought together they adhere to one another, since the inclined sides 16 of the first sheet's tapered elements 15 frictionally adhere to the inclined sides 26 of the second sheet's tapered elements 25.

In the unfastened position, the structured surfaces 14 and 24 of the first 12 and second 20 sheets generally comprise solid pyramidal-shaped elements having a polygonal-shaped cross-section. The phrase pyramidal-shaped elements is used herein to include truncated versions such as the frusto-pyramidal-shaped elements 15 and 25 shown in FIGS. 2 and 3. The pyramidal-shaped elements 15 and 25 generally include a polygonal-shaped cross-section such as the square shown in FIGS. 2 and 3. Alternatively, the cross-section may be rectangular, regular hexagonal, hexagonal, triangular, circular, elliptical, combinations thereof, or combinations of straight and arcuate line segments.

The particular material used to construct the sheets 12 and 20 may be any suitable material so long as at least one of the materials affords a flexible tapered element 15 or 25 that may axially bend and torsionally twist or flex. Various materials may be used such as but not limited to commercially available acrylics, vinyls, polymers (including electron beam or radiation cured polymers), polyethylenes and polycarbonates. Particular examples include polymethyl methacrylate, polystyrene, non-rigid polyvinyl chloride with plasticizers, and biaxially-oriented polyethylene terephthalate. Additionally, the material may be biodegradable, transparent or translucent, electrically conductive or magnetic according to the particular application. Additionally, any of the materials mentioned in U.S. Pat. No. 4,875,259 may be used, and this patent is herein incorporated by reference in its entirety.

EXAMPLE 1

Figure 7:
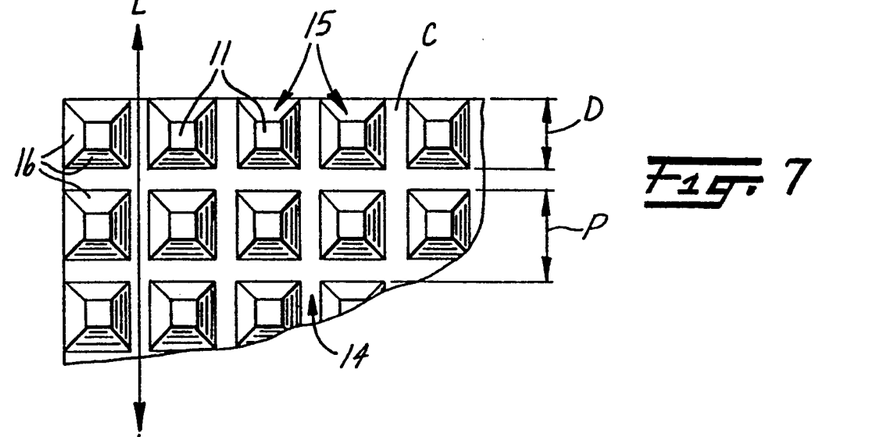
FIG. 7 is a plan view of the embodiment of frusto-pyramidal-shaped tapered elements on the structured surface of one of the pair of sheets of the package assembly according to the present invention which illustrates a square cross-section for the tapered members.
Figure 8:
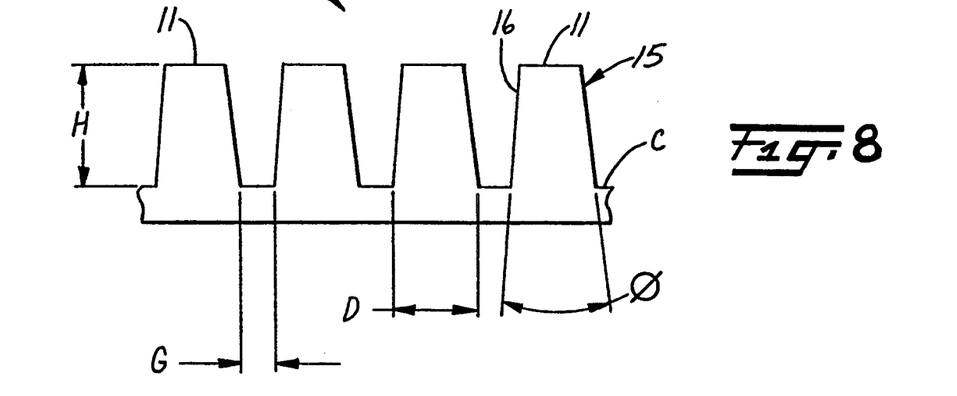
FIG. 8 is an enlarged sectional view of the structured surface of FIG. 7, with parts broken away to illustrate details of the geometry of the structured surface.

An example of one of the sheets 12 used to provide the closure means 10 is shown in FIGS. 7 and 8. The tapered elements 15 include top surfaces or portions 11 which define a height H measured from the common plane C.

The sheets in this example comprise identical, rectangular strips of PVC sheet with plasticizers. Each of the sheets 12 and 20 were flexible and had integral, uniform flexible elements 15 and 25. The dimensions of the sheets were: approximately 12.7 centimeters, (5 inches"

) long, about 2.54 centimeters. (1 inch") wide, and with total thickness of about 1.0-1.27 millimeters. (40-50 mils).

The sheets 12 and 20 comprised polyvinyl chloride constructed from clear #516 PVC pellets obtained from Alpha Chemical and Plastics Corporation 9635 Industrial Drive, Pineville, N.C. (manufacturer no. 2215-80). The sheets 12 and 20 had a first broad smooth surface, and a second broad structured surface (e.g. 14 and 24) wherein the structure was of the orthogonal type having two mutually perpendicular axes of periodicity, and one longitudinal axis L or L' (as shown in FIGS. 2, 3 and 7).

The structured surfaces 14 and 24 had about a 0.63 millimeter or 25 mil groove depth or height H, a 9 degree 36 minute (rounded to 10°) included angle between tapered surfaces 16 or 26 (shown as the angle phi in FIG. 8), a pitch or lattice constant of about 0.33 millimeters, (13.08 mils) (shown as P in FIG. 7), top dimensions of approximately 0.12 by 0.12 mm. (4.86 by 4.86 mils) (e.g. the length of the sides of the top surfaces 11 or 21), and a width at the base of grooves of about 0.23 millimeters, (9.06 mils) (shown in FIG. 7 as the diameter D). The distance G shown in FIG. 8 is simply P—D or 0.10 millimeters.

When the polyvinyl chloride made from clear #516 PVC pellets obtained from Alpha Chemical and Plastics Corporation 9635 Industrial Drive, Pineville, N.C. (manufacturer no. 2215-80) was used, it was found that the flexible elements with the above mentioned dimensions twisted and bent sufficiently to enable the closure means 10 to have an identifiable pattern.

Also, when the closure comprises sheets having a structured surface with the size and geometry of described in this example 1, it is very difficult to determine that the structured surfaces take a particular shape without inspecting them through a microscope. Thus, the reusable security package of the present invention may optionally provide a security system that is not readily apparent to a person who tampers with the package.

Numerous factors affect the ability of the tapered elements 15 or 25 to bend or twist when the sheets 12 and 20 are pressed together. For example, the material characteristics, the cross sectional shape of the elements 15 or 25 (e.g. square or rectangular etc.), the angle between tapered surfaces (e.g. the angle phi), the height H to diameter D ratio H/D and the pitch P to diameter D ratio P/D are all believed to affect the tapered element's capacity to twist or bend.

All other factors held constant, the height H to diameter D should be sufficient to afford bending and twisting of the elements 15 or 25. In example 1, the height to diameter ratio H/D was (0.63 millimeters/0.23 millimeters)=2.74. This H/D ratio for this material was found to work well. All other factors held constant, the H/D ratio should be numerically large enough to afford flexing and twisting of the element 15 or 25. However, if the ratio H/D is too large, then the tapered elements 15 and 25 excessively bend and tend to interfere with each other, thereby impeding closure. If the ratio H/D is too small, then the tapered elements 15 or 25 tend to become too rigid to twist and bend and thus there is no pattern, clearly an undesirable result.

Additionally, all other factors held constant, the pitch P to diameter D ratio P/D should be sufficient to afford bending and twisting of the elements 15 or 25. For example, in example 1, the P/D ratio is 0.33/0.23=1.43. This P/D ratio for this example was found to work well and to provide for a pattern of orientation of the elements 15 and 25. All other factors held constant, the P/D ratio should be numerically large enough to afford flexing and twisting of the element 15 or 25. However, if the ratio P/D is too large, then it is believed that the elements 15 and 25 will not twist and bend and will instead remain in or return to their unfastened position, clearly an undesirable result for this application and use. If the ratio P/D is too small, then the tapered elements 15 or 25 tend to become too closely spaced and tend to excessively interfere with each other so that little or no bending or twisting occurs. Thus the package would have no pattern that may be recorded and then compared.

The sheets 12 and 20 described in Example 1 were constructed in the following manner. First, a Pasadena Hydraulics, Inc., 50 Ton Model Compression Molding Press (generally available from Pasadena Hydraulics, Inc. of Pasadena, Calif.) was used. The molding surfaces were constructed to provide a sheet having the dimensions set forth above in Example 1. The PVC material described above was used.

The molding surfaces were constructed by first diamond cutting a UV curable polymer to provide a molding sample article having the dimensions and shape set forth above in Example 1. Optionally, any suitable acrylic plastic material may be used. Diamond turning equipment such as the Moore Special Tool Co. Model M-40 or the Pneumo. Co. Model SS-156 (e.g. SN 76936) may be used to construct the molding sample article.

Of course, it will be appreciated by those skilled in the art that the closure of the present invention need not be individually machined but may instead be produced using a replication process. Thus, to construct the molding surfaces, the molding sample mentioned above was used in a conventionally electroforming process (similar to the electroforming process mentioned in U.S. Pat. No. 4,871,623 the entire contents of which are herein expressly incorporated by reference) to provide the suitable molding surface. For example, a nickel molding surface may be electroformed from the acrylic plastic sample article mentioned above.

Optionally, in some closure designs, it may be advantageous to directly machine a molding surface from a metal, molding surface material, with no electroforming process. Another option may be to initially machine a surface similar to the desired molding surface in a metal material, then molding a molding sample article from the metal surface, and then electroforming the molding surface using the molding sample article.

Once the molding surfaces are constructed, the PVC pellets were placed between the molding surfaces of the Compression Molding Press. The molding surfaces of the press were heated to 350 degrees fahrenheit, after which a force of about 4350 pounds per square inch was exerted on the molding surfaces for a time period of two minutes. After two minutes, the force was increased to 45,000 pounds per square inch for a time period of two minutes.

The molding surfaces were then cooled to about 100 degrees fahrenheit while a force of 45,000 pounds per square inch was maintained for a time period of ten minutes. After the ten minute time period, the 45,000 pounds per square inch force was removed. The sheet was then removed from the molding surfaces.

There are several other methods which may be used to produce the sheets 12 and 20 according to the present invention which are known in the art, such as the methods disclosed in U.S. Pat. Nos. 3,689,346 and 4,244,683 to Rowland; 4,875,259 to Appeldorn; 4,576,850 to Mertens; and U.K. Patent Application No. GB 2,127,344 A to Pricone et al. the entire contents of which are herein expressly incorporated by reference.

It should be noted that the tapered elements 15 or 25 of one sheet may be positive elements (e.g. solid elements which project from their respective common plane C) and the elements of the other sheet may be negative elements (e.g. cavities which are recessed from their respective common plane C) so that the sides of the positive elements may engage with the sides of the negative elements to adhere thereto. Additionally, it should be appreciated that the cross-sectional shape of the tapered elements of the first sheet may be dissimilar to the cross-sectional shape of the tapered elements of the second sheet. For example, hexagonal shaped tapered elements may be positive elements and may engage with negative, triangular shaped elements.

As set forth below, it has been found that, surprisingly, the peel strength characteristics of the sheets 12 and 20 is greater at some angles (theta) that are more than zero degrees than the peel strength characteristics of the sheets 12 and 20 at zero degrees.

TEST RESULTS

Referring now to FIGS. 11, 12 and 13A through 13E, two sheets 12 and 20 of the type described with reference to Example 1 were tested for peel strength.

A series of tests were run to determine the angular dependence of the peel force required to separate two engaged, structured surface sheets 12 and 20. An Instron Model 1122 "Universal Testing Instrument", for precision testing of the mechanical properties of materials was used in the tests. The environmental test conditions were a constant temperature of 70° F. and constant relative humidity of 50%.

Test samples were identical rectangular strips of PVC sheets with plasticizers. The dimensions of the sheets are described in example 1. Each test strip had a first broad smooth surface, and a second broad structured surface wherein the structure was of the orthogonal type (the type shown in FIGS. 2 and 3) having two mutually perpendicular axes of periodicity, as described in relation to FIGS. 2, 3, 7 and 8. The structured surface was the same as that described in example 1.

Figure 12:
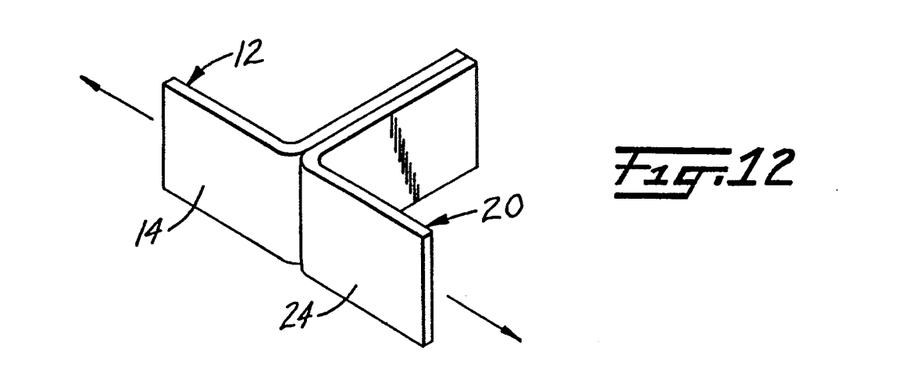
FIG. 12 is a schematic perspective view illustrating how the peel strength test of FIG. 11 was performed.
Figure 13A:
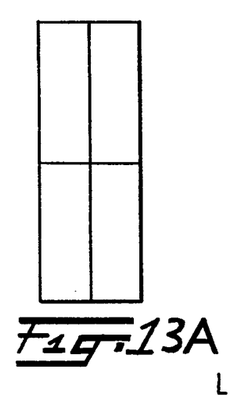
FIGS. 13A through 13E are representations of the alignments of the pair of sheets during the peel strength test summarized in FIG. 11.
Figure 13B:
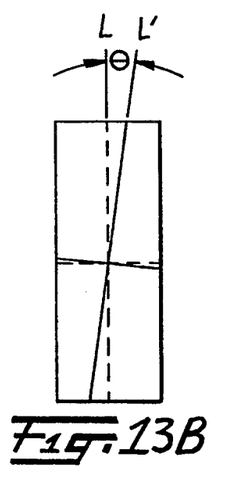
Figure 13C:
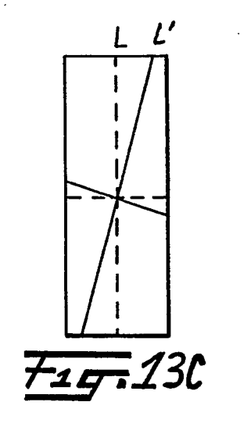
Figure 13D:
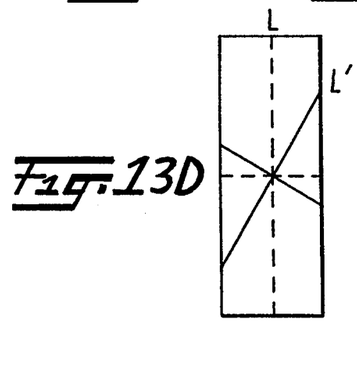
Figure 13E:
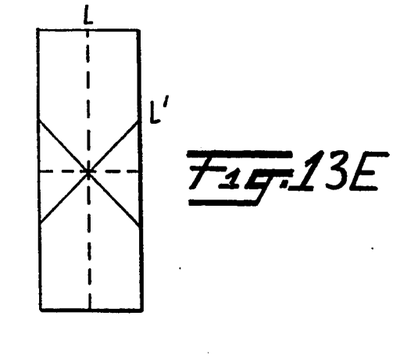

FIG. 12 schematically illustrates how a pair of sheets 12, 20 was tested using the Instron described above. Each of the sheets 12 and 20 had flexible elements 15 and 25. Closure means 10 were tested in pairs (e.g. 12 and 20). Each sample pair was positioned with their second structured surfaces 14 and 24 in mutual contact and with their axes of periodicity mis-aligned by the predetermined misalignment angle theta (0°, 7.5°, 15°, 30° or 45°, in respective tests). The misalignment angles are shown in FIGS. 13A through 13E.

Each pair of misaligned sample strips was engaged in frictional attachment by approximately a 20 Newton (4.5 lb.) force exerted by a smooth-rubber-surfaced metal roller with 4.4 cm. (1.75") tread-width, and a 4.76 cm. (1,875") radius. In each test, the first smooth side (e.g. the side opposite 14) of a "first" strip was fastened to a horizontal platen using a strip of tape coated on both sides with a high-tack, pressure sensitive adhesive.

The horizontal platen design permitted translational movement along a single axis in the horizontal plane. One end of the "second" strip was attached to a vertically movable member of the test instrument with the plane of the attached portion perpendicular to the horizontal axis of movement of the platen, and to the remaining frictionally attached portions of the second strip (see FIG. 13). As a result of the movable platen and during the course of each measurement, a 90° angle was maintained at the separation interface between the vertically moving portion of the second strip and the frictionally attached portion of the first strip. The peel strength tested is known as 180 degree T-peel.

The instantaneous peel force, plotted as a function of vertical position, varied as the movable strip or sheet was moved in a vertical direction. The variations were, at least in part, because the width of the separation interface varied due to the misalignment angle.

Both (1) an instantaneous peak or maximum value, and (2) an average value over a time period during which the separation interface was essentially constant, were measured in two separate runs for each misalignment angle theta. Both the instantaneous peak and average values were estimated after viewing the data providing by the Instron and the testing equipment. Both sets of peak and "time-average" values, shown in Table A, show that the maximum peel force is achieved at a misalignment angle of about 7.5°. Results of the tests are summarized in Table A, and the "statistical" average values for the two runs are set forth in Table B. The data in Table B are graphically represented in FIG. 11, with the average peel strength identified as the "K" curve and the peak peel strength identified as the "J" curve.

TABLE A

| Angle: | Test Num. | Average Peel Strength Grams per inch | Peak Peel Strength Grams per inch |
|---|---|---|---|
| 0 | 1. | 100 | 135 |
|   | 2. | 120 | 145 |
| 7.5 | 1. | 185 | 240 |
|   | 2. | 185 | 225 |
| 15 | 1. | 180 | 200 |
|   | 2. | 150 | 175 |
| 30 | 1. | 50 | 55 |
|   | 2. | 30 | 40 |
| 45 | 1. | 40 | 48 |
|   | 2. | 50 | 56 |

Table B is an average of the values shown in Table A.

TABLE B

| Angle: | Average Peel Strength Grams per inch | Ave. Peak Peel Strength Grams per inch |
|---|---|---|
| 0 | 110 | 140 |
| 7.5 | 185 | 232.5 |
| 15 | 165 | 187.5 |
| 30 | 40 | 47.5 |
| 45 | 45 | 52 |

APPLICATION

As an example not intended to be limiting, the closure means 31 may comprise an envelope intended to transport a restricted-access document from one location to another. For example, a user may wish to transport such a document from a location in the United States to another location, such as France, and once the document and envelope has arrived, the user may desire to determine whether an unauthorized person has opened the envelope.

According to the present invention, the user would first place the document within the envelope 31 and then move the closure means 10 from the open to the closed position. Next, the equipment illustrated in FIG. 16 is used to view at least a predetermined portion of the pattern (e.g. the orientation or shape of the tapered elements 15 and 25) of the first and second sheet's elements 15 and 25. For example, they may appear as shown in FIG. 14.

Next, the predetermined portion of the pattern of the first and second sheet's elements 15 and 25 is recorded just after the closure means 10 moves to the closed position to provide a verification record. For example the verification record may comprise the photograph of FIG. 14 or 15. Additionally, the verification record may include information that would enable a user at a remote location to attempt to duplicate FIG. 14 or 15 with equipment shown in FIG. 16. For example such information may include the camera setting, speed, the magnification, the predetermined location of the sheets 12 and 20 where the photograph was taken, or the particular light that may be used to find the framework defining the predetermined portion of the pattern of the elements.

Alternatively, the instrumentation for recording and viewing the pattern of the closure means 10 need not be that described in FIG. 16 but may instead comprise a computer scanner, or a scanner capable of discerning color (e.g. if colored films are used).

Optionally, the verification record may be stored on the closure means itself. For example, the photograph may be sealed within an envelope 18 (FIG. 1) attached to the closure means 31 itself. Preferably, the verification record may be transported to the remote location (France in the example) by means of a separate and different courier.

Next, once the verification record, document or object and the envelope have arrived at the remote location (France in the example), a user may then view the pattern of the first and second sheet's elements 12 and 20 just prior to opening the closure means. Finally, the user would then compare the pattern of the first and second sheet's elements 12 and 20 just prior to opening the closure means 10 with the verification record to verify whether the closure means has been opened.

The present invention has now been described with reference to several embodiments thereof. It will be apparent to those skilled in the art that many changes or additions can be made in the embodiments described without departing from the scope of the present invention. Thus, the scope of the present invention should not be limited to the structures described in this application, but only by structures described by the language of the claims and the equivalents of those structures.

What is claimed is:

1. A method of closing a container means for enclosing an object and for verifying whether the container has been opened comprising the steps of:
    (1) providing a reusable container means for enclosing the object, said container means comprising interior and exterior surfaces, and closure means for closing said container means, said closure means being movable between an open position which provides access to said interior surfaces of said container means so that the object may be enclosed by said container means and a closed position which restricts access to the interior surfaces of said container means,
    said closure means comprising:
    a first sheet having at least one major surface at least a portion of that surface being a structured surface;
    said first sheet's structured surface including a plurality of tapered elements, each element having at least one side inclined relative to a common plane at an angle sufficient to form a taper;
    said first sheet's plurality of tapered elements being situated to form a plurality of axes including at least one first sheet longitudinal axis;
    a second sheet having at least one major surface at least a portion of that surface being a structured surface;
    said second sheet's structured surface including a plurality of tapered elements, each element having at least one side inclined relative to a common plane at an angle sufficient to form a taper;
    said second sheet's plurality of tapered elements being situated to form a plurality of axes including at least one second sheet longitudinal axis;
    wherein, in said closed position, said first and second sheets are fastened together with the first longitudinal axis situated at an angle relative to the second longitudinal axis such that at least one of said tapered elements of said first or said second sheet is axially bent or torsionally flexed relative to its relaxed, unfastened position, and said inclined sides of one of said first and second sheet's tapered elements being frictionally adhered to at least some of said inclined sides of the other of said first and second sheet's tapered elements, such that said first and second sheet's elements form a generally non-repeatable pattern when the closure means is in said closed position,
    (2) enclosing the object within the container means,
    (3) moving the closure means from the open to the closed position;
    (4) then viewing at least a predetermined portion of the pattern of the first and second sheet's elements;
    (5) recording the predetermined portion of the pattern of the first and second sheet's elements just after the closure means moves to the closed position to provide a verification record;
    (6) then viewing the pattern of the first and second sheet's elements just prior to opening the closure means; and
    (7) comparing the pattern of the first and second sheet's elements just prior to opening the closure means with the verification record to verify whether the closure means has been opened.

* * * * *

UNITED STATES PATENT AND TRADEMARK OFFICE
CERTIFICATE OF CORRECTION

PATENT NO. : 5,360,270
DATED : November 1, 1994
INVENTOR(S) : Roger H. Appeldorn, et al It is certified that error appears in the above-indentified patent and that said Letters Patent is hereby corrected as shown below:

Column 11, line 61, "(1,875")" should be --(1.875") --.

Signed and Sealed this

Twenty-sixth Day of September, 1995

Attest:

BRUCE LEHMAN

*Attesting Officer*  *Commissioner of Patents and Trademarks*